(12) United States Patent
Chiang

(10) Patent No.: US 7,417,807 B2
(45) Date of Patent: Aug. 26, 2008

(54) OPTICAL MODULE

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 74 days.

(21) Appl. No.: 11/437,939

(22) Filed: May 19, 2006

(65) Prior Publication Data
US 2007/0041106 A1  Feb. 22, 2007

(51) Int. Cl.
*G02B 7/02* (2006.01)
*G03B 17/00* (2006.01)
*H04N 5/225* (2006.01)

(52) U.S. Cl. .................. 359/811; 396/529; 348/374

(58) Field of Classification Search .......... 359/513, 359/704, 811, 809, 819; 362/455; 353/100; 396/529–530; 348/335, 340, 373–374
See application file for complete search history.

(56) References Cited

U.S. PATENT DOCUMENTS

2002/0158985 A1* 10/2002 Saitoh et al. ............. 348/340
2006/0028573 A1* 2/2006 Seo et al. ................. 348/340

* cited by examiner

*Primary Examiner*—Scott J. Sugarman
*Assistant Examiner*—Dawayne A Pinkney
(74) *Attorney, Agent, or Firm*—Andrew C. Cheng

(57) ABSTRACT

An optical module (100) includes a lens barrel (10), a lens (201), a filter (40), and a groove (105). The lens is engagingly received in the lens barrel. The filter is engagingly received in the lens barrel with an adhesive. The groove is defined in the lens barrel. The groove is adjacent to an outer periphery of the filter to receive the adhesive so as to prevent it from infiltrating into the lens.

18 Claims, 6 Drawing Sheets

OPTICAL MODULE

TECHNICAL FIELD

The present invention generally relates to optical modules used in photography and imaging equipment and, more particularly, to an optical module for a digital camera.

BACKGROUND

Currently, digital camera modules are included as a feature in a wide variety of portable electronic devices and, of course, in stand-alone digital camera units. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

Optical modules used for digital camera modules typically include a barrel, a lens module, a spacer, and a filter. The lens module and the spacer are received in the barrel. The filter is fixedly mounted in the barrel by using, for example, an adhesive, thereby preventing the lens module and the filter from falling out of the barrel. When the adhesive used to adhere the filter to the barrel is dilute, it can seep into the lens module via capillary action, thus impairing imaging quality of the optical module.

Therefore, a new optical module is desired in order to overcome the above-described shortcomings.

SUMMARY

In one embodiment thereof, an optical module includes a lens barrel, a lens, a filter, and a groove. The lens is engagingly received in the lens barrel. The filter is engagingly received in the lens barrel with an adhesive. The groove is defined in the lens barrel and is adjacent to an outer periphery of the filter to prevent the adhesive from infiltrating into the lens.

Other novel features will become more apparent from the following detailed description when taken in conjunction with the accompanying drawings.

BRIEF DESCRIPTION OF THE DRAWINGS

Many aspects of the optical module can be better understood with reference to the following drawings. The components in the drawings are not necessarily drawn to scale, the emphasis instead being placed upon clearly illustrating the principles of the present optical module. Moreover, in the drawings, like reference numerals designate corresponding parts throughout the several views.

DETAILED DESCRIPTION OF THE EMBODIMENTS

Figure 1:
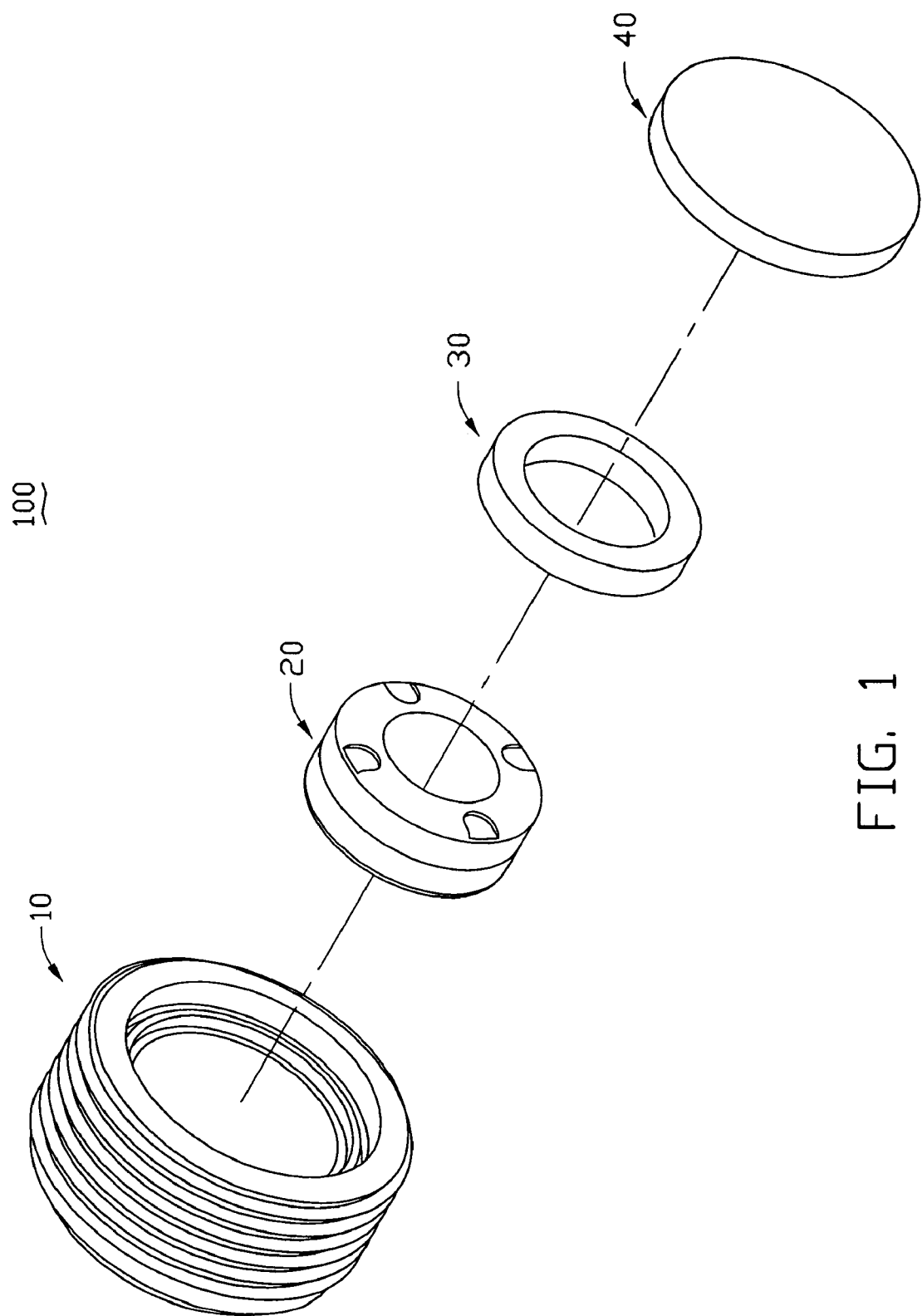
FIG. 1 is an exploded, isometric view of an optical module in accordance with a first embodiment.

Referring to FIG. 1, an optical module 100 according to a first embodiment of the present invention includes a lens barrel 10, a lens module 20, a spacer 30, and a filter 40. The lens module 20, the spacer 30, and the filter 40 are engagingly received in the lens barrel 10 one on top of the other in that order.

Figure 2:
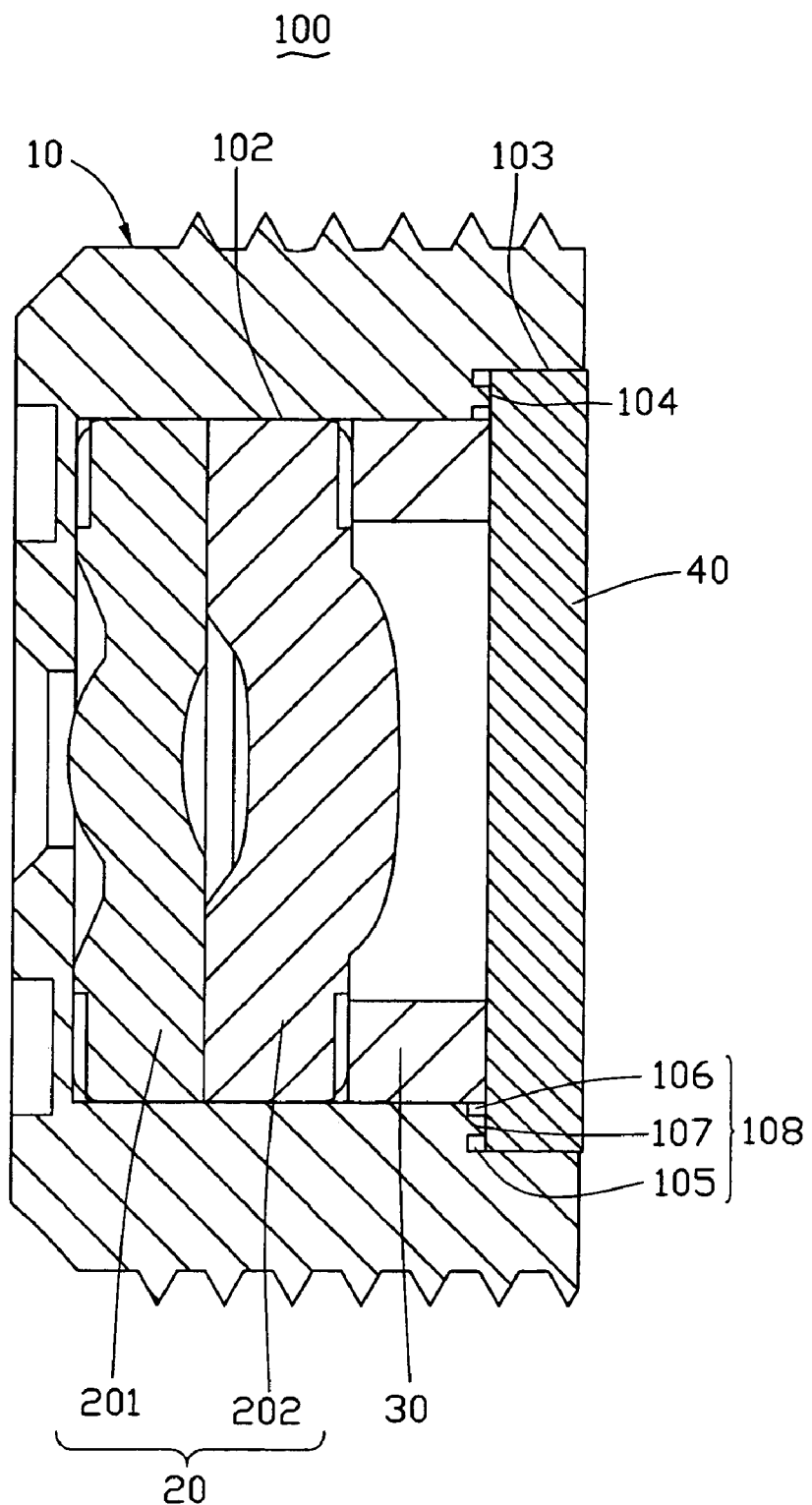
FIG. 2 is an enlarged, assembled, cross-sectional view of the optical module shown in FIG. 1.

Referring also to FIG. 2, the lens barrel 10 is substantially a hollow cylinder, having a partially-closed end and an open end on the opposite end to the partially-closed end. The lens barrel 10 includes a first cylinder portion 102 with a small inner diameter and a second cylinder portion 103 with a large inner diameter. The first cylinder portion 102 is adjacent to the partially-closed end, and the second cylinder portion 103 is adjacent to the open end. The first cylinder portion 102 is configured for receiving the lens module 20 and the spacer 30. The second cylinder portion 103 is configured for receiving the filter 40. The filter 40 is mounted in the second cylinder portion 103 with an adhesive. The first cylinder portion 102 and the second cylinder portion 103 cooperatively form a step surface 104. An annular first groove 105 and an annular second groove 106 are defined in the step surface 104. An annular protrusion 107 is formed between the first groove 105 and the second groove 106. The first groove 105, the second groove 106, and the protrusion 107 cooperatively form an adhesive stop mechanism 108. The adhesive stop mechanism 108 is configured for receiving the adhesive used for adhering the filter 40 to the lens barrel 10 and preventing it from infiltrating into the lens module 20.

The lens module 20 includes at least one lens. In the illustrated embodiment, the lens module 20 includes two lenses 201, 202. It is to be understood that lenses of any number and type could be used in the lens module 20.

The spacer 30 is substantially ring-shaped. The spacer 30 is engagingly received in the first cylinder portion 102 of the lens barrel 10. The spacer 30 is configured for adjusting a distance between the lens module 20 and other optical elements (for example the filter 40) of the optical module 100.

The filter 40 is substantially disk-shaped. The filter 40 is engagingly received in the second cylinder portion 103 of the lens barrel 10. The filter 40 is used to selectively transmit light having certain properties, while blocking the remainder. The filter 40 can be selected, for example, from a group consisting of infrared-cut filters and low pass filters.

In assembly of the optical module 100, the lens module 20, the spacer 30, and the filter 40 are received in the lens barrel 10 in that order, with the lens module 20 and the spacer 30 located in the first cylinder portion 102, and the filter 40 located in the second cylinder portion 103. Then, the filter 40 is secured in the second cylinder portion 103 by using, for example, an adhesive, thereby preventing the lens module 20 and the spacer 30 from falling out of the lens barrel 10, and fixing the lens module 20 and the spacer 30 in the lens barrel 10. At this time, the spacer 30 is located between the lens module 20 and the filter 40, and the adhesive stop mechanism 108 is adjacent to an outer periphery of the filter 40, with the spacer 30 abutting the lens module 20 and the filter 40, and the filter 40 abutting the protrusion 107. The optical module 100 is thus completely assembled.

In the above-described assembly processes, the filter 40 is secured in the lens barrel 10 by using an adhesive. When the adhesive is dilute, it will infiltrate into the adhesive stop mechanism 108, thus preventing it from polluting the lens module 20. Imaging quality of the optical module 100 can thus be improved.

Figure 3:
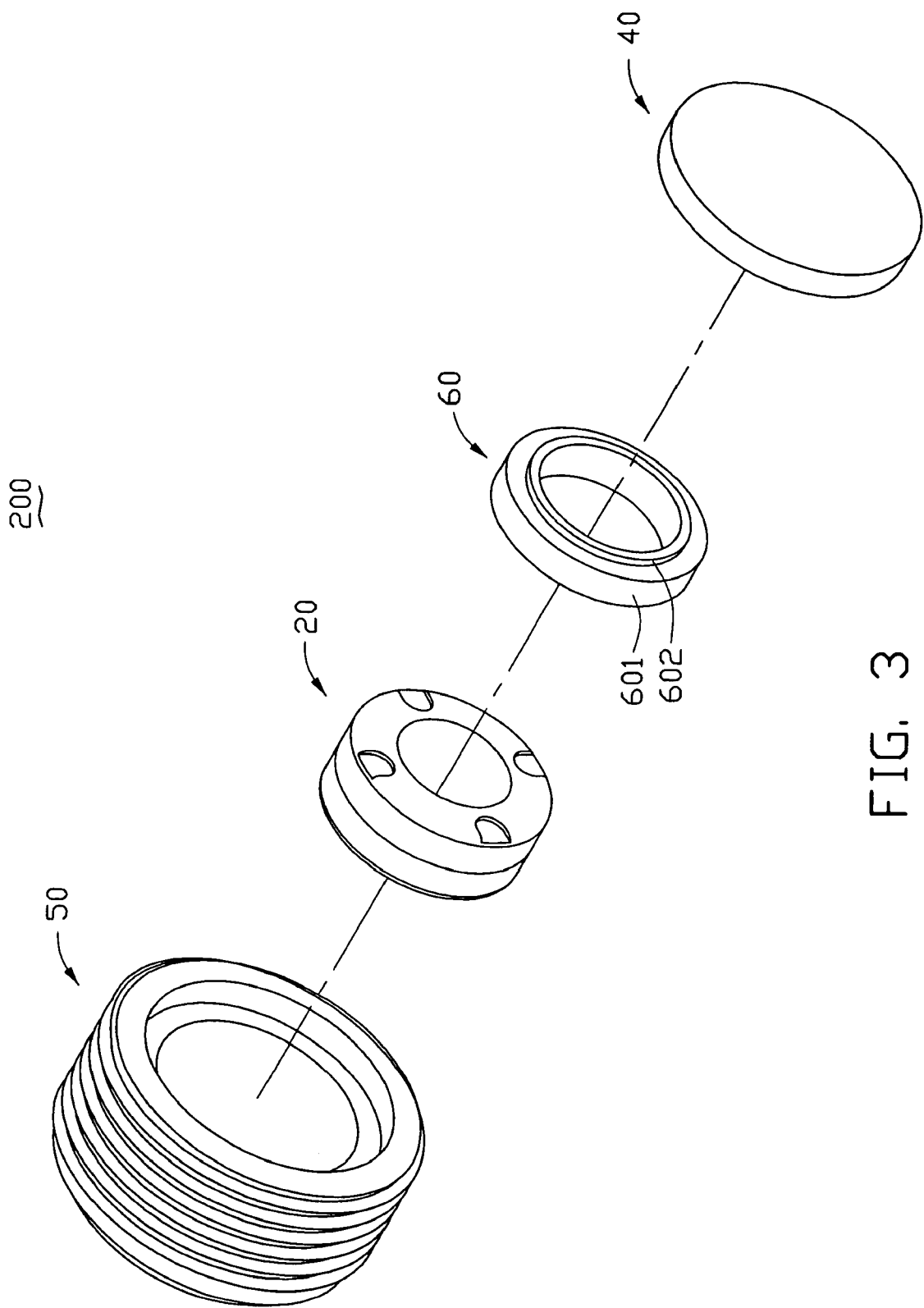
FIG. 3 is an exploded, isometric view of an optical module in accordance with a second embodiment.
Figure 4:
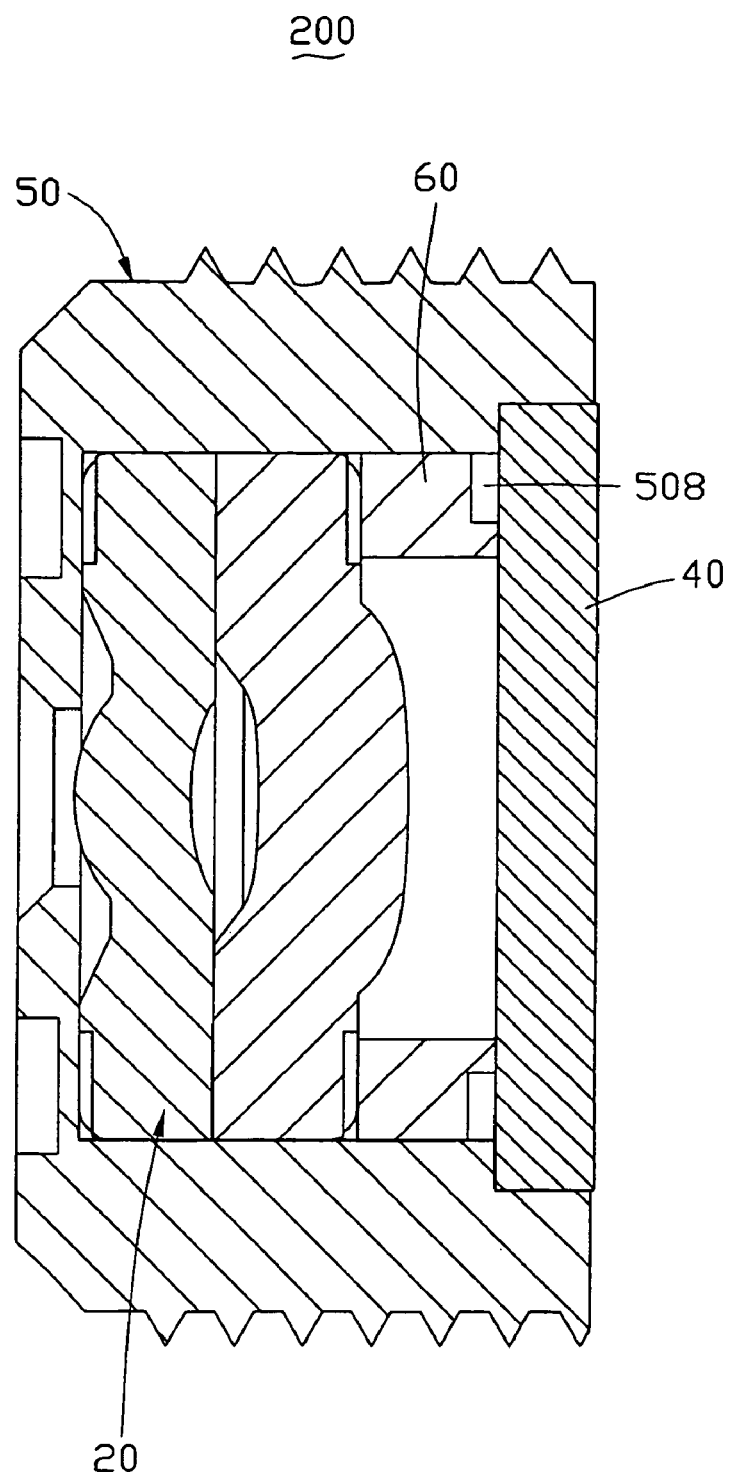
FIG. 4 is an enlarged, assembled, cross-sectional view of the optical module shown in FIG. 3.

Referring to FIG. 3, an optical module 200 according to a second embodiment of the present invention is shown. Referring also to FIG. 4, most of the structure of the optical module 200 of the second embodiment is similar to that of the optical module 100 of the first embodiment, except that a spacer 60 includes a large outer diameter portion 601 and a small outer diameter portion 602, and the first, second grooves 105, 106 can be omitted. The spacer 60 is received in a lens barrel 50, with the large outer diameter portion 601 engaged in the lens barrel 50 and abutting the lens module 20, and the small outer diameter portion 602 abutting the filter 40. The filter 40 is mounted in the lens barrel 50 with an adhesive. The spacer 60, the filter 40, and the lens barrel 50 cooperatively form an adhesive stop mechanism 508. The adhesive stop mechanism 508 is adjacent to the outer periphery of the filter 40. The adhesive stop mechanism 508 is substantially an annular groove, and stores the adhesive used for adhering the filter 40 to the lens barrel 50, thereby preventing the adhesive from polluting the lens module 20. Imaging quality of the optical module 200 can thus be improved.

Figure 5:
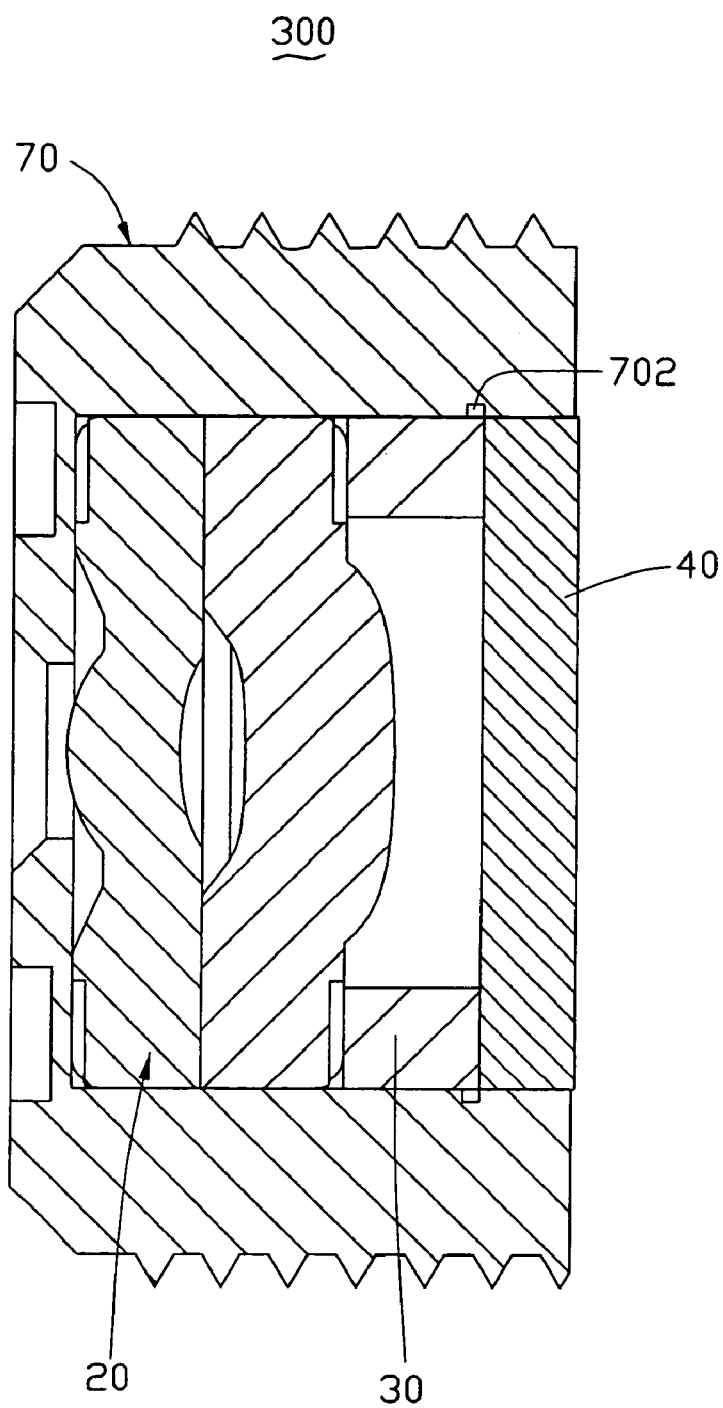
FIG. 5 is an assembled, cross-sectional view of an optical module in accordance with a third embodiment.

Referring to FIG. 5, an optical module 300 according to a third embodiment of the present invention is shown. Most of the structure of the optical module 300 of the third embodiment is similar to that of the optical module 100 of the first embodiment, except that a lens barrel 70 has a uniform inner diameter. An annular groove 702 is defined in an inner periphery of the lens barrel 70, and is adjacent to the outer periphery of the filter 40. The filter 40 is secured in the lens barrel 70 by using, for example, an adhesive, thereby preventing the lens module 20 and the spacer 30 from falling out of the lens barrel 70, and fixing the lens module 20 and the spacer 30 in the lens barrel 70. The groove 702 acting as an adhesive stop mechanism stores the adhesive, thereby preventing the adhesive from polluting the lens module 20. Imaging quality of the optical module 300 can thus be improved.

Figure 6:
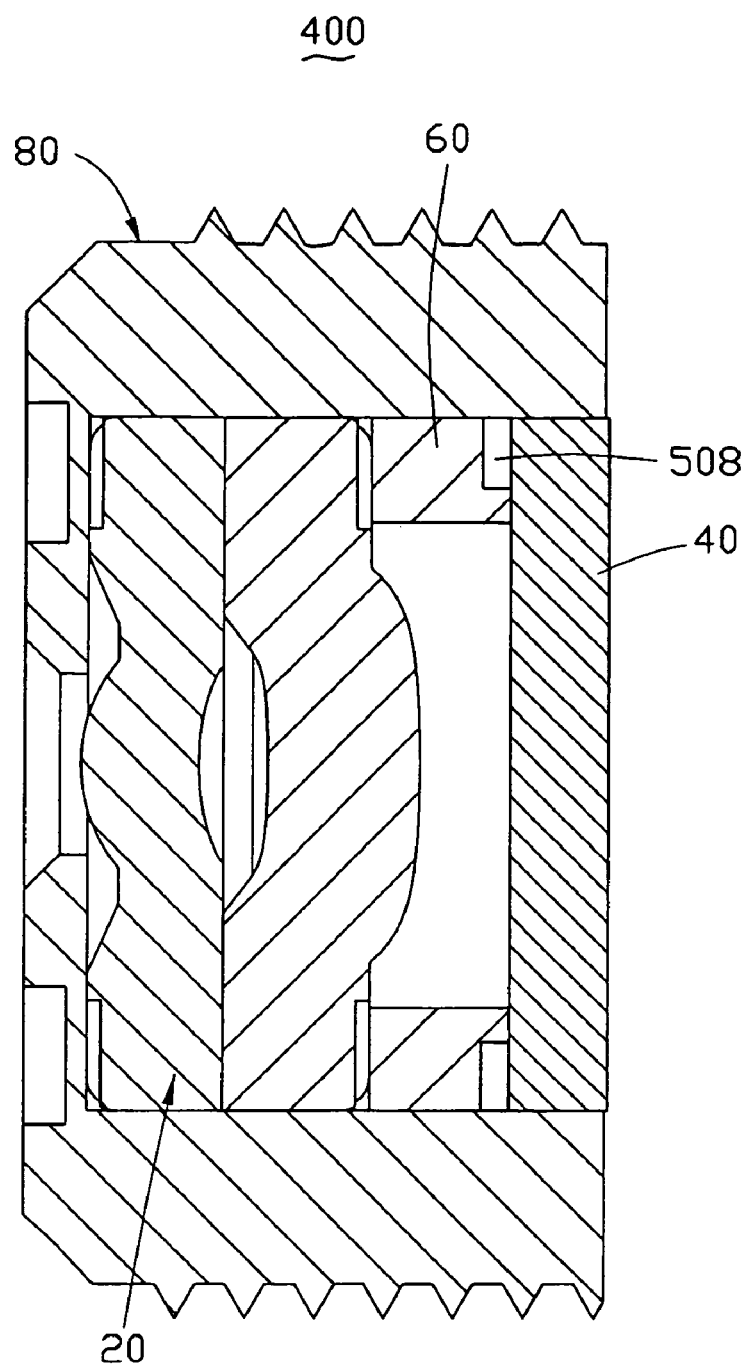
FIG. 6 is an assembled, cross-sectional view of an optical module in accordance with a fourth embodiment.

Referring to FIG. 6, an optical module 400 according to a fourth embodiment of the present invention is shown. Most of the structure of the optical module 400 of the fourth embodiment is similar to that of the optical module 200 of the second embodiment, except that a lens barrel 80 has a uniform inner diameter. The spacer 60 is received in the lens barrel 80, and abuts the lens module 20 and the filter 40. The filter 40 is mounted in the lens barrel 80 with an adhesive. The spacer 60, the filter 40, and the lens barrel 80 cooperatively form the adhesive stop mechanism 508. The adhesive stop mechanism 508 is adjacent to the outer periphery of the filter 40. The adhesive stop mechanism 508 is substantially an annular groove, and stores the adhesive used for adhering the filter 40 to the lens barrel 80, thereby preventing the adhesive from polluting the lens module 20. Imaging quality of the optical module 400 can thus be improved.

In the above-described embodiments, the lens barrels 10, 50, 70, 80, the spacers 30, 60, and the filter 40, are all round-shaped. In alternative embodiments, the lens barrels 10, 50, 70, 80, the spacers 30, 60, and the filter 40 could be another suitable shape, for example, arc-shaped.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical module, comprising:
a lens barrel including a first cylinder portion with a small inner diameter and a second cylinder portion with a large inner diameter;
at least one lens engagingly received in the lens barrel;
a filter engagingly received in the lens barrel with an adhesive; and
a groove defined in a step surface formed between the second cylinder portion and the first cylinder portion of the lens barrel and being adjacent to an outer periphery of the filter to prevent the adhesive from infiltrating into the lens.

2. The optical module as claimed in claim 1, wherein the lens barrel is a hollow cylinder having a partially-closed end and an open end on the opposite end to the partially-closed end.

3. The optical module as claimed in claim 2, further comprising a spacer, wherein the spacer is engagingly received in the lens barrel, with the spacer abutting the lens and the filter.

4. The optical module as claimed in claim 3, wherein the spacer is ring-shaped.

5. The optical module as claimed in claim 2, further comprising a spacer, wherein the spacer includes a large outer diameter portion and a small outer diameter portion, the spacer is engagingly received in the lens barrel, with the large outer diameter portion abutting the lens and the small outer diameter portion abutting the filter, and the groove is formed by the spacer, the filter and the lens barrel.

6. The optical module as claimed in claim 2, wherein the filter is disk-shaped.

7. The optical module as claimed in claim 2, wherein the groove is defined in an inner periphery of the lens barrel.

8. The optical module as claimed in claim 1, wherein the lens barrel is a hollow cylinder having a partially-closed end and an open end on the opposite end to the partially-closed end, and the first cylinder portion with a small inner diameter is adjacent to the partially-closed end, and the second cylinder portion with a large inner diameter is adjacent to the open end.

9. The optical module as claimed in claim 8, further comprising a spacer, wherein the spacer is engagingly received in the first cylinder portion of the lens barrel, with the spacer abutting the lens and the filter.

10. The optical module as claimed in claim 8, further comprising a spacer, wherein the spacer includes a large outer diameter portion and a small outer diameter portion, the spacer is engagingly received in the lens barrel, with the large outer diameter portion abutting the lens, and the small outer diameter portion abutting the filter, and the groove is formed by the spacer, the filter and the lens barrel.

11. The optical module as claimed in claim 8, wherein the filter is disk-shaped, and is received in the second cylinder portion of the lens barrel.

12. The optical module as claimed in claim 8, wherein the lens barrel further includes the second groove, is defined in the step surface formed between the second cylinder portion and to first cylinder portion of the lens barrel, and a protrusion is formed between the groove and the second groove.

13. An optical module, comprising:
a lens barrel;
at least one lens located in the lens barrel;
a filter secured in the lens barrel by using an adhesive so as to prevent the lens from falling out of the lens barrel;
a stop mechanism configured for receiving the adhesive and preventing it from infiltrating into the lens; and
a spacer including a large outer diameter portion and a small outer diameter portion, the spacer being engagingly received in the lens barrel, with the large outer diameter portion abutting the lens, and the small outer diameter portion abutting the filter, and the adhesive stop mechanism being formed by the spacer, the filter and the lens barrel.

14. The optical module as claimed in claim 13, further comprising a spacer, wherein the spacer is engagingly received in the lens barrel and located between the lens and the filter.

15. The optical module as claimed in claim 13, wherein the adhesive stop mechanism is an annular groove and is defined in an inner periphery of the lens barrel, with the adhesive stop mechanism adjacent to an outer periphery of the filter.

16. The optical module as claimed in claim 13, wherein the lens barrel includes a first cylinder portion with a small inner diameter and a second cylinder portion with a large inner diameter, and two spaced grooves are defined in a step surface formed between the first cylinder portion and the second cylinder portion, and the adhesive stop mechanism is formed by the grooves and a protrusion formed between the grooves.

17. An optical module, comprising:

a lens barrel;

at least one lens mounted in the lens barrel;

a filter secured in the lens barrel with an adhesive so as to prevent the lens from falling out of the lens barrel, the filter having a filter peripheral portion;

an adhesive stop mechanism formed proximate to the filter peripheral portion, the adhesive stop mechanism being configured for preventing the adhesive from infiltrating into the lens to contaminate the optical module; and a spacer mounted in the lens barrel between the lens and the filter;

wherein the adhesive stop mechanism includes a groove portion cooperatively formed by the spacer and the lens barrel.

18. The optical module as claimed in claim 17, wherein the adhesive stop mechanism includes a groove portion formed in the lens barrel.

* * * * *